US008027883B2

(12) United States Patent
Donaldson

(10) Patent No.: US 8,027,883 B2
(45) Date of Patent: *Sep. 27, 2011

(54) AFFILIATE MANIPULATION SYSTEM AND METHOD

(75) Inventor: Willie L. Donaldson, Arlington, VA (US)

(73) Assignee: Linear Five Corp., Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/907,638

(22) Filed: Oct. 19, 2010

(65) Prior Publication Data

US 2011/0035267 A1 Feb. 10, 2011

Related U.S. Application Data

(63) Continuation of application No. 11/053,608, filed on Feb. 8, 2005, now Pat. No. 7,818,214.

(60) Provisional application No. 60/552,364, filed on Mar. 12, 2004.

(51) Int. Cl.
*G06Q 30/00* (2006.01)

(52) U.S. Cl. .................................... 705/26.43

(58) Field of Classification Search ............... 705/26.1, 705/26.43
See application file for complete search history.

(56) References Cited

U.S. PATENT DOCUMENTS

| 5,948,061 A | 9/1999 | Merriman et al. |
| 5,999,912 A | 12/1999 | Wodarz et al. |
| 6,029,141 A | 2/2000 | Bezos et al. |
| 6,052,730 A | 4/2000 | Felciano et al. |
| 6,092,074 A | 7/2000 | Rodkin et al. |
| 6,317,761 B1 | 11/2001 | Landsman et al. |
| 6,434,614 B1 | 8/2002 | Blumenau |
| 6,629,135 B1 | 9/2003 | Ross, Jr. et al. |
| 7,818,214 B2 | 10/2010 | Donaldson |
| 2001/0034644 A1 | 10/2001 | Anavi et al. |
| 2002/0007309 A1 | 1/2002 | Reynar |

(Continued)

FOREIGN PATENT DOCUMENTS

WO  WO 2010/009341 A2  1/2010

OTHER PUBLICATIONS

Schwartz, John et al., "New Software Quietly Diverts Sales Commissions", The New York Times, Late Edition—Final ED, col. 02, p. 1, Friday Sep. 27, 2002.*

(Continued)

*Primary Examiner* — Donald L Champagne
(74) *Attorney, Agent, or Firm* — Malloy & Malloy, P.A.

(57) ABSTRACT

An affiliate manipulation system that permits consumers, ISPs, search engines and intermediaries to maximize affiliate program participation in transactions by or through them. The affiliate manipulation system accesses an affiliate-capable merchant through the Internet at the direction of a buyer or consumer through an ISP or search engine. An affiliate code for a preferred commercial agent is inserted into the purchase order. The preferred commercial agent is the buyer or consumer, ISP, search engine or other designated recipient. When the buyer initiates a purchase from the affiliate-capable merchant, the system inserts the affiliate code for the preferred commercial agent where there was no affiliate code, or replaces an existing affiliate code in favor of the preferred commercial agent. A purchase order is effected through the affiliate-capable merchant. The order is completed and credit for the sale is given to the preferred commercial agent, based upon the affiliate code.

8 Claims, 4 Drawing Sheets

U.S. PATENT DOCUMENTS

| | | |
|---|---|---|
| 2002/0007393 A1 | 1/2002 | Hamel |
| 2002/0010757 A1 | 1/2002 | Granik et al. |
| 2002/0055933 A1 | 5/2002 | Feathers et al. |
| 2002/0111865 A1 | 8/2002 | Middleton, III et al. |
| 2002/0120503 A1 | 8/2002 | Iwayama et al. |
| 2002/0169662 A1 | 11/2002 | Claiborne |
| 2002/0169760 A1 | 11/2002 | Cheung et al. |
| 2003/0055816 A1 | 3/2003 | Paine et al. |
| 2003/0088465 A1 | 5/2003 | Monteverde |
| 2003/0105677 A1 | 6/2003 | Skinner |
| 2003/0135413 A1 | 7/2003 | Nishi et al. |
| 2003/0163370 A1 | 8/2003 | Chen et al. |
| 2003/0220837 A1 | 11/2003 | Asayama |
| 2003/0229893 A1 | 12/2003 | Sgaraglino |
| 2005/0149851 A1 | 7/2005 | Mittal |
| 2005/0171838 A1 | 8/2005 | Eglinton |
| 2005/0203766 A1 | 9/2005 | Donaldson |

OTHER PUBLICATIONS

Definition of "intermediary" (n), Merriam-Webster's Collegiate Dictionary, 10th ed. (Springfield MA: Merriam Webster), 1997.

Mossberg, W., "Dangerous Detours:Windows XP May Add Its Links to Others' Sites", The Wall Street Journal (Eastern Edition), Jun. 7, 2001, p. B1, downloaded Jul. 25, 2007 from ProQu.

"Hacking Amazon—O_Reilly Media", Web pages downloaded Sep. 11, 2009 from http://www.oreillynet.com/pub/a/javascript/excerpt/AmazonHacks_samples/?page=2.

"Process Tags plugin_Adam Kalsey", Web Pages downloaded Sep. 12, 2009 from http://www.kalsey.com/2002/08/process_tags_plugin/.

* cited by examiner

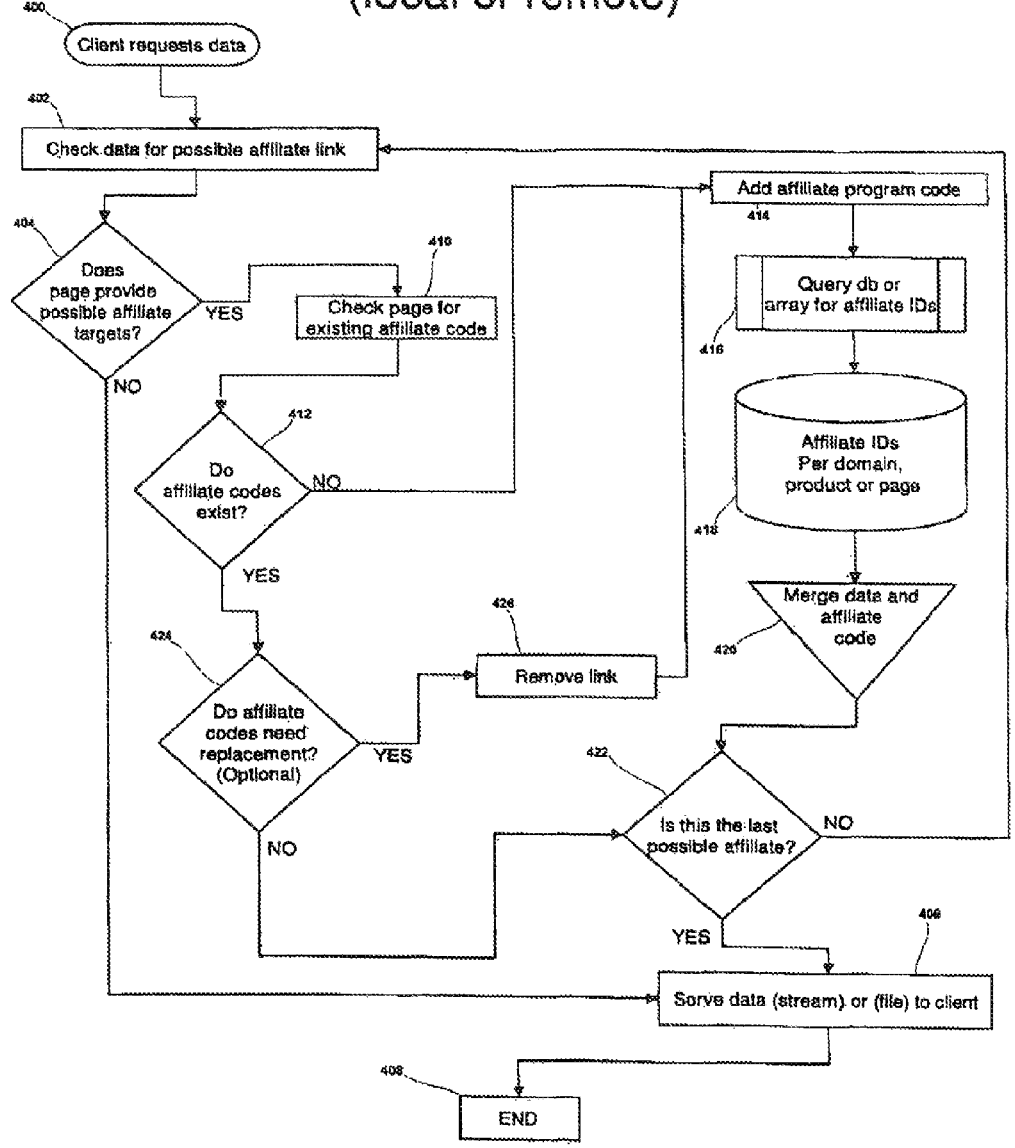

AFFILIATE MANIPULATION SYSTEM AND METHOD

CLAIM OF PRIORITY

The present application is a Continuation patent application of previously-filed patent application having Ser. No. 11/053,608, filed on Feb. 8, 2005, now U.S. Pat. No. 7,818,214, which claims priority to a previously-filed provisional patent application having Ser. No. 60/552,364, filed on Mar. 12, 2004, the contents of both of which are incorporated herein by reference in their entirety.

BACKGROUND OF THE INVENTION

1. Field Of The Invention

The present invention relates to affiliate programs for commercial web sites. In particular, the present invention relates to an affiliate manipulation system and method to maximize the use of available Internet affiliate programs.

1. Description Of The Related Art

Many commercial Internet web sites offer incentives for others to provide links to their sites. The links provide an opportunity for the referring web site to earn a commission on a resulting sale. These programs are often identified as affiliate programs. The referring sites are affiliates. Affiliate programs provide a way for linked web sites and competing companies to work together for a mutual benefit. The referring web site, or affiliate, is credited a commission for the sale, and the seller, or primary merchant, receives a sale from a buyer who was not originally shopping at the seller's web site. This is a win-win situation for all parties. However, the affiliate process is not used nearly as often as it could be. There are several reasons for this. The first reason is that the seller may require the affiliate to register in advance to receive an identification code (affiliate code) by which the affiliate's referrals, and commissions, can be identified. Second, many programs require special dedicated software downloads, patches or applets to function. Often, this requires that the user's computer has a particular web browser or computer capabilities to operate the specialized software or that the affiliate has special software. These requirements are unnecessarily burdensome on the user and his equipment. Another reason for underutilization of affiliate commissions is that many buyers go directly to the larger, primary web merchant, seller or manufacturer, eliminating the middlemen and the opportunity for commissions. In these situations, the affiliate programs are not used at all.

To maximize affiliate commissions, it is preferable to treat each sale as a sale through an affiliate party who is entitled to the commission. The system and process may be operated remotely by the seller or another intermediary or central party, such as an Internet service provider (ISP) or a search engine operator. Any software, hardware or other concerns would be handled at the central party. Thus, the buyer and other parties would not need special equipment or software.

Therefore, there has been and continues to be a need for an affiliate program system that does not require the user or buyer to have or maintain additional dedicated or specialized software or computer capabilities, that automatically establishes affiliate relationships, and that allows a buyer, referral party or a central party to receive the commission for a sale.

SUMMARY OF THE INVENTION

The invention is an affiliate manipulation system and method that permits computers users, ISPs, search engines and other intermediaries to maximize affiliate program participation in transactions by or through them. The system accesses an affiliate-capable merchant through the Internet by a buyer or consumer, or through an ISP or search engine. An affiliate code for a preferred commercial agent is inserted into the purchase order. The preferred commercial agent is the buyer or consumer, ISP, search engine or other designated recipient. When the buyer initiates a purchase from the affiliate-capable merchant through the ISP or search engine, the system inserts the affiliate code for the preferred commercial agent where there was no affiliate code, or replaces an existing affiliate code in favor of the preferred commercial agent. Finally, a purchase order is effected through the affiliate-capable merchant, ending the process. The order is completed and credit for the sale is given to the preferred commercial agent, based upon the affiliate code.

It is an object of the present invention to accomplish the foregoing objectives in a simple and cost effective manner.

BRIEF DESCRIPTION OF THE DRAWINGS

FIG. 4 is a process flowchart for the affiliate manipulation system, in accordance with the present invention.

DETAILED DESCRIPTION OF THE PREFERRED EMBODIMENT

The following detailed description is of the best presently contemplated modes of carrying out the invention. This description is not to be taken in a limiting sense, but is made merely for the purpose of illustrating general principles of embodiments of the invention.

The present invention provides an affiliate manipulation system and method providing for sales commissions for Internet-based sales. The system does not require the users, buyers or other intermediaries to register into affiliate programs in advance or to have particular software or computer capabilities. Users, buyers or intermediaries will be able to receive a commission for normal consumer behavior through commercial web sites that offer a sales commission to affiliates.

Figure 1:
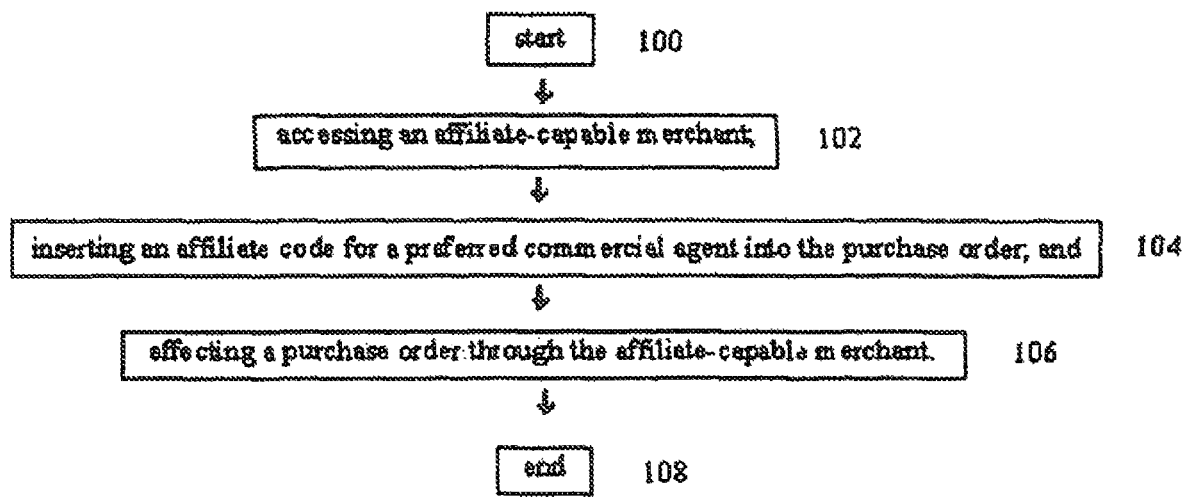
FIG. 1 is a flowchart of the steps used by an affiliate manipulation system, in accordance with the present invention.

FIG. 1 shows a method for operating an affiliate manipulation system. The system starts, step 100, by accessing an affiliate-capable merchant, step 102. This is accomplished through the Internet by a buyer or consumer through an ISP or search engine. Next, step 104, an affiliate code for a preferred commercial agent is inserted into the purchase order. The preferred commercial agent is the buyer or consumer, ISP, search engine or other designated recipient. When the buyer initiates a purchase from the affiliate-capable merchant through the ISP or search engine, the system inserts the affiliate code for the preferred commercial agent where there was no affiliate code, or replaces an existing affiliate code in favor of the preferred commercial agent. Finally, at step 106, a purchase order is effected through the affiliate-capable merchant, ending the process, step 108. The order is completed and credit for the sale is given to the preferred commercial agent, based upon the affiliate code. In one embodiment, a sales commission is credited or sent from the affiliate-capable merchant to the preferred commercial agent. The buyer, ISP search engine or other designated recipient stores a record of each affiliate-capable merchant found. This is a record of URLs, web sites or web pages. These records are stored to streamline the process during subsequent commercial transactions with the same affiliate-capable merchants.

In one embodiment, step 102, accessing an affiliate-capable merchant, is the sum of several smaller steps, starting by requesting data by a user. The user, who is a buyer, ISP or search engine requests data. The data will be in the form of a web address, URL, keyword or similar mechanism. The typical buyer will start his request through his ISP or a search engine, making the ISP or search engine into a central party who is eligible to become a preferred commercial agent. The preferred commercial agent is the party or parties who are preferred to benefit from the affiliate programs or other arrangements. The buyer may also be the preferred commercial agent, particularly if the ISP or search engine is not capable of manipulating any existing affiliate data. However, the ISP, search engine or other central party is in a position to benefit from the unused affiliate program opportunities.

Next, the buyer receives the requested data. The data received is usually in the form of a URL or a list of URLs or web sites or pages. The ISP, search engine or other central party has a copy of this information on its servers as well. Next, the data is analyzed, at the buyer, the ISP, search engine or other central party, for a possible affiliate link. In one embodiment, the system analyzes the possible affiliate link for a URL associated with an affiliate program. The possible affiliate link may be a URL associated with an affiliate program, but where the possible affiliate link does not comprise a URL associated with an affiliate program, the system serves the data to the user and ends the process.

Each possible affiliate link is searched for one or more possible affiliate-capable merchants. In one embodiment, the system creates an affiliate link array to determine potential affiliates and stores the affiliate link array in a database. The affiliate link array may include keyword data, domain name data, URL data, and affiliate capabilities associated with each URL or domain name.

Many URLs are linked and cross-linked to other sites and URLs. Each of these affiliate-capable merchants will be identified for possible inclusion in the database of affiliate information. The system accesses one or more pages associated with each of the affiliate-capable merchants in an affiliate link array. This array is the center of the affiliate information in the database. In one embodiment, when the system finds a valid URL in the affiliate link array, it searches the valid URL for an existing affiliate code. A valid URL is one that is affiliate-capable. The system ends the process when no valid URL is found in the affiliate link array. An affiliate-capable URL may also comprise keyword data resulting in a valid (affiliate-capable) URL. An existing affiliate code may be an affiliate code that directs sales commission fees to a particular commercial agent, but not necessarily the preferred commercial agent.

The system searches each of the pages for an existing affiliate code. The existing affiliate code, if any, is analyzed. The system creates an affiliate process array, in the database, for the affiliate-capable merchants. The affiliate process array may include a plurality of affiliate-capable URLs or other relevant information. The information in the array is analyzed for unique affiliate program information for each affiliate-capable merchant. The unique affiliate program information for each affiliate-capable URL may define or be defined under a validation rule for each affiliate program associated with each of the affiliate-capable URLs. The unique affiliate program information or validation rule may be a unique code or a unique format or a combination of the two, and may be a unique suffix added to an affiliate-capable URL. Next, the system creates a valid replacement affiliate URL sequence associated with each affiliate-capable merchant for the preferred commercial agent. This is accomplished in accordance with the unique affiliate program information identified above. The valid replacement affiliate URL sequence is merged with the affiliate-capable merchant data in the affiliate link array and the merged information is prepared for output. This is one way of establishing an affiliate relationship and the identity of the preferred commercial agent. The merged data is stored in the array to streamline the process during subsequent commercial activity with that same affiliate-capable URL. Subsequent transactions are processed much more quickly because the validation rules for a previously-identified affiliate-capable merchant are known.

Next, the system must determine if the existing affiliate code is for the preferred commercial agent. If the existing affiliate code is for the preferred commercial agent, then an affiliate relationship already exists. The system could then search the array to cross-reference the affiliate-capable URLs against known affiliate relationships. Any validation rules or codes could then be updated, if they have changed. When an existing affiliate code is found, the system should determine if additional affiliate codes exist. The system will fill the array as much as possible to streamline the process for subsequent transactions. Though the process may appear to be seamless and instantaneous to a user or buyer, a lot of extra processing must occur to establish affiliate relationships where none existed. Some relationships may take more time than a user or buyer is prepared to wait. In that case, the sale or other transaction must be the priority, with the system saving such data into the array to establish an affiliate relationship at the earliest possibility so that subsequent transactions are appropriately credited to the preferred commercial agent.

When no additional affiliate code exists, the system prepares the affiliate code information for processing. However, if additional affiliate codes are found, the system will continue to prepare the additional affiliate codes for processing. All this may be done in the background, without interfering with the user or buyer's transaction.

When the existing affiliate code is for the preferred commercial agent, the system prepares the existing affiliate code for processing. In this instance, the affiliate code is acceptable and no change is necessary. However, when the existing affiliate code is not for the preferred commercial agent, the system replaces the existing affiliate code with the affiliate program code for the preferred commercial agent. An existing affiliate program code will be for someone other than the preferred commercial agent in a number of common situations. The most common situation is where the user accesses a web page or URL for a secondary merchant. The secondary merchant is a smaller web site or company that does not necessarily stock each and every item that it offers for sale. Instead, with regard to that merchandise, the secondary merchant becomes the sales agent for a primary merchant. The primary merchant is typically a very large company that is capable of stocking many things that smaller merchants cannot. In their relationship, the smaller, secondary merchant does not stock an item, but can earn a commission by referring a buyer to the larger company. In other cases, the buyer may not be redirected at all. The entire purchase may seem to be accomplished through the smaller merchant. Regardless, the smaller merchant is a commercial agent, but unless it is the preferred commercial agent, the system will change the affiliate code to that of the preferred commercial agent. The system must modify the URL without interfering with the HTML design or otherwise interfering with its functionality. The validation rules will be followed. In this manner, the preferred commercial agent receives credit for the sale instead of another middleman.

In one embodiment, step 104, inserting an affiliate code for a preferred commercial agent into the purchase order, is the sum of several smaller steps, starting as the system serves the affiliate data having a valid affiliate URL sequence to the affiliate-capable merchant; and receives the valid affiliate data at the affiliate-capable merchant. Next, the affiliate-capable merchant identifies the affiliate code for the preferred commercial agent, and pays a commission to the preferred commercial agent. The affiliate-capable merchant must be able to properly identify the preferred commercial agent based upon the affiliate code. Care must be taken to ensure the affiliate code is correct. There is no one, standard format for identifying an affiliate in an Internet transaction. Typically, the Internet merchant uses a special suffix attached to the Internet sales information to identify proper commercial agents. Again, there is no one standard format. The array in the database is analyzed for the unique format necessary to identify a commercial agent.

A commercial agent makes very little money on each sale. It may be difficult for a single buyer to justify the setup and database storage time and expense for his own purchases. It would make more sense for the system to be used by a search engine operator or ISP, who would see a tremendous volume of Internet commerce.

Figure 2:
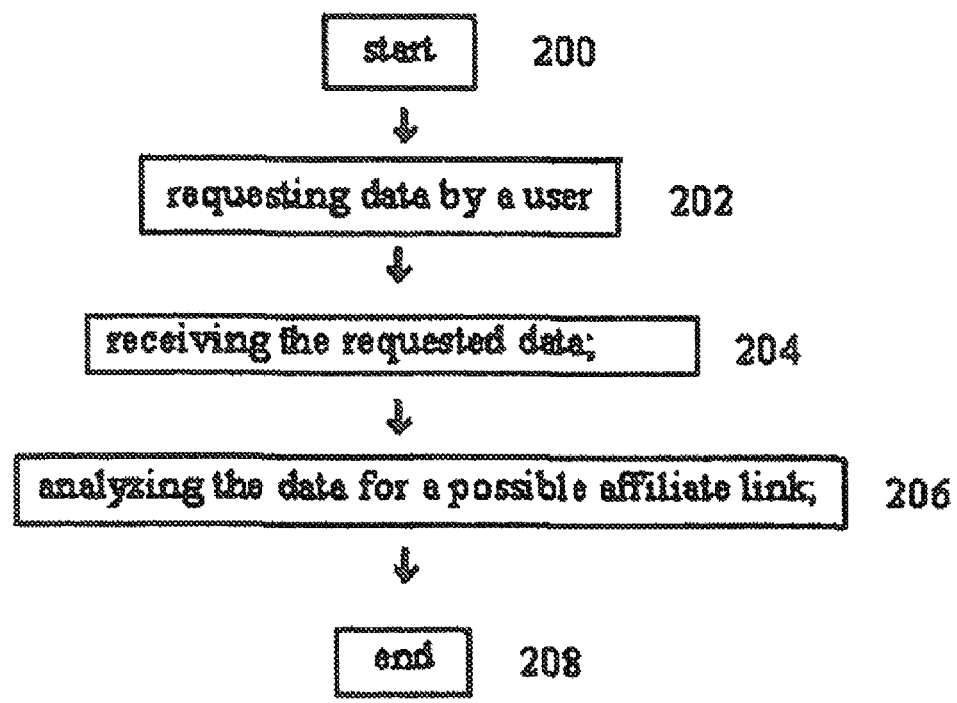
FIG. 2 is a flowchart of the steps used by the affiliate manipulation system, in accordance with the present invention.

FIG. 2 shows an alternate method for operating an affiliate manipulation system. The process starts, step 200, when the user requests data at step 202. The user can perform the search directly or through an intermediary, such as a search engine or ISP. At step 204, the user receives the requested data. If the user is using an intermediary, the intermediary would have a copy of the request and the received data. Next, step 206, the system analyzes the data for a possible affiliate link, ending the process at step 208. The system may be contained within the user's equipment or with the intermediary. In most cases, the system will be under the control of the intermediary.

The system analyzes the possible affiliate link for a URL associated with an affiliate program. Where the possible affiliate link does not include a URL associated with an affiliate program, the system serves the data to the user and ends the process. However, where the possible affiliate link includes a URL associated with an affiliate program, the system continues the process.

Next, the system searches the possible affiliate link for one or more possible affiliate-capable targets. An affiliate-capable target includes a reference to an affiliate program, a URL or an HTML link to an affiliate program, or some other indicia of an affiliate program. The system creates an affiliate link array to determine potential affiliates, and accesses one or more pages associated with the one or more affiliate-capable targets in the affiliate link array. When a valid URL is found in the affiliate link array, the system searches the valid URL for an existing affiliate code. A valid URL is a URL that is actively used in an affiliate program. It may be for a particular commercial agent or for any party interested in becoming a commercial agent of the affiliate-capable target. When no valid URL is found in the affiliate link array, the system ends the process. The user will continue his transaction unaware of the affiliate manipulation process. However, even if a valid URL were found, the user's transaction would continue unimpeded. All of the system's processing is accomplished behind the scenes without the user's knowledge.

For this example we will assume that the affiliate-manipulation process will continue. The system searches each of the pages associated with the one or more affiliate-capable URLs in the affiliate link array for an existing affiliate code. The existing affiliate code may be one that identifies another commercial agent as the source of a sale. The system creates an affiliate process array for the affiliate-capable URLs. This array can be a perpetual array, continually added to whenever a new affiliate-capable URL or affiliate code is found. Alternatively, a new array can be started at each transaction. The smaller arrays may be merged later if desired. Next, the system queries the database for unique affiliate program information for each affiliate-capable URL. There are few standards for the format or layout for affiliate program information, including affiliate codes. Each must be closely scrutinized to determine what is important and what makes it work.

The system creates a valid replacement affiliate URL sequence, for the preferred commercial agent, that is appropriate for the affiliate-capable URL. The valid replacement affiliate URL sequence is merged with the affiliate-capable URL data in the affiliate link array, and the merged information is prepared for output. The existing affiliate code does not always need to be replaced.

When an existing affiliate code is found, the system determines if the existing affiliate code is for a preferred commercial agent. The preferred commercial agent is the party or parties designated to receive credit for the commercial transactions. When an existing affiliate code is found, the system will keep working to determine if additional affiliate codes exist. When no additional affiliate code exists, all of the affiliate code information is prepared for processing. In another embodiment, when no existing affiliate code is found, the system inserts the affiliate code for a preferred commercial agent. When the existing affiliate code is for the preferred commercial agent, the existing affiliate code information is prepared for processing.

When the existing affiliate code is not for the preferred commercial agent, the existing affiliate code is replaced with the affiliate program code for the preferred commercial agent. First, the system removes the existing affiliate code. Next, the affiliate program code for the preferred commercial agent is inserted in its place. The system matches the format and style of the existing affiliate code to ensure that it functions properly or uses the unique affiliate code assigned by the affiliate-capable merchant. This part of the process functions quickly when there is an existing relationship between the preferred commercial agent and the affiliate-capable merchant. Alternatively, the system can first determine whether the preferred commercial agent has an affiliate relationship with the affiliate-capable merchant. Where no relationship is found, the system automatically establishes an affiliate relationship with the affiliate-capable merchant, and inserts the affiliate program code for the preferred commercial agent. Automatically establishing an affiliate relationship requires the system to submit required information, about the preferred commercial agent, to the affiliate-capable merchant.

Next, the system queries the database for unique affiliate program information for each of the affiliate-capable URLs and creates a valid affiliate identity for each of the affiliate-capable URLs. The domain and affiliate suffix are merged together to create a valid URL for each of the affiliate-capable URLs, following the validation rules for each of the affiliate-capable URLs. The validation rules are derived from the format and content of any existing affiliate codes or as assigned by the primary merchant. This ensures that the preferred commercial agent is properly credited for the sale.

Next, the valid URL and affiliate data are merged in the affiliate link array and saved for implementation. The merged information is prepared for output. If there are other possible affiliates, the system may go back and process them. When there are no other possible affiliates, the data is served to the user. The affiliate data is then saved for offline processing. When an intermediary is used, the intermediary will save the data for offline processing. The data may be served to a client or service.

Next, the valid URL may be used to complete a commercial transaction. The valid URL with the affiliate data is received at each primary merchant. Each primary merchant identifies the preferred commercial agent based on the affiliate data in each valid URL. Each primary merchant pays a commission to the desired commercial agent based on the affiliate data in each valid URL, ending the process.

This process can function in real time to quickly establish a relationship between a preferred commercial agent and a primary merchant, or to provide at least a functional, valid URL to give credit to the preferred commercial agent. This can often be accomplished within the time it takes for a user to complete a commercial transaction. However, sometimes a primary merchant will not recognize a valid URL if no relationship with the preferred commercial agent existed before. It may be necessary for the system to submit appropriate information to the primary merchant to receive the information or code required to create a valid URL that the primary merchant will recognize. This may take more time than is necessary for the user to complete his commercial transaction. When this happens the new valid data is placed into the database in the appropriate array, ready to be used later. Any subsequent transaction with that primary merchant will be properly processed and credited to the preferred commercial agent. In this manner, a user or intermediary can take advantage of virtually every affiliate program opportunity that exists.

Figure 3:
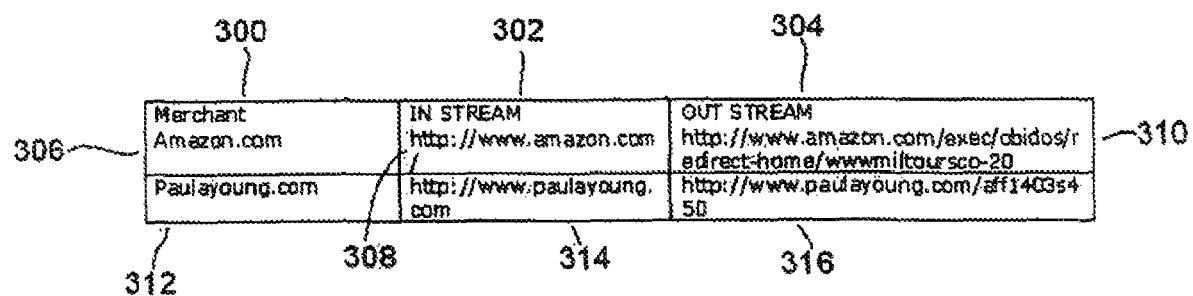
FIG. 3 is a sample of a database array for use with the affiliate manipulation system, in accordance with the present invention.

FIG. 3 is a sample of a database array for use with the affiliate manipulation system, in accordance with the present invention. These are examples of the kinds of information that may be stored in the database arrays, both the affiliate link array and the affiliate process array. A merchant column 300 provides a place to store the name of each merchant in the database. An in stream column 302 provides a place to store each affiliate-capable URL associated with each merchant in the merchant column 300. A merchant may have multiple rows assigned to it, depending upon the number of affiliate-capable URLs associated with the merchant name. An out stream column 304 provides a place to store affiliate data associated with each merchant in the merchant column 300. Two examples of sample data associated with a merchant are shown.

In example 1, the merchant is amazon.com 306. The user requested data about a book or other merchandise that is available at the amazon.com web site. The user would receive one or more URLs or similar information in response to his request. The amazon.com URL 308, http://www.amazon.com/, is shown as an example of what type of information would be received in response to his request. The amazon.com affiliate link 310 shows an example of what an affiliate would send to amazon.com to receive credit for a sale. In this example, the database operator, whether an ISP, a search engine operator or other party, is providing the means for an affiliate to receive credit for a sale. In this case, the affiliate is identified through the suffix to the affiliate link 310, www-miltoursco-20.

The second example shows another merchant 312, paulayoung.com. The URL information received in response to a request was http://www.paulayoung.com 314. The affiliate link 316 is http://www.paulayoung.com/aff1403s450. The affiliate code is aff1403s450 found after the basic URL. This is quite a different format than that of amazon.com 306. Thus, it is important to maintain a record, in this case a database, to of the specific code and/or format required to properly receive credit for a sale as an affiliate. Any number of data fields may be created to properly track and create affiliate links, depending upon the requirements and preferences of the user.

FIG. 4 is a process flowchart for the affiliate manipulation system, in accordance with the present invention. The process starts, step 400, when the user requests data through the Internet. The user can be a consumer, a search engine, an ISP or an entity between the consumer and a primary merchant. The user receives data in response to his request. The response may be URLs, web sites or web pages. At step 402, the system checks the data for a possible affiliate link. The affiliate link is a means by which a user can enroll in an affiliate program or by which affiliate data can be submitted to receive sales credit. Affiliate links that contain URLs that participate in affiliate programs are affiliate targets. If there are no possible affiliate targets 404, the system serves the data, step 406, to the user and ends the process, step 408.

However, if at step 404 the system finds possible affiliate targets, the system checks the URLs for existing affiliate codes, step 410. If no affiliate codes exist, step 412, the system adds the affiliate program code to the affiliate target information, step 414. Affiliate codes, the information that identifies the affiliate, may be determined from an earlier transaction or may be determined as the current transaction occurs, depending on time constraints. Next, step 416, the system queries the database or array for affiliate information based on the affiliate target information. The affiliate information is retrieved from the database, step 418, and the affiliate information, to include the affiliate code and URL information, is merged, step 420. If this is the last possible affiliate, step 422, then the system serves the data to the user at step 406 and ends the process, step 408. If there are more possible affiliates, step 422, the system goes back to step 402 to analyze the data for additional possible affiliate links. This is done until all possible affiliates links have been identified and processed through the system.

However, if, at step 412, there are one or more existing affiliate codes, the system determines if the affiliate codes need to be replaced, step 424. If the affiliate codes are not for a preferred commercial agent, then the existing affiliate code is removed, step 426, and the system continues to step 414 to add this information to the database. If the existing affiliate code is for the preferred commercial agent, the affiliate code will not need to be replaced and the system continues to step 422.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for operating an automated affiliate manipulation system comprising:
   identifying a transmission of preexisting data directed toward a first computer over a communication network,
   identifying the preexisting data at an intermediary computer, the intermediary computer being separate from the first computer, analyzing the preexisting data at the intermediary computer to automatically identify at least one data element corresponding to an affiliate-capable merchant, determining that the at least one data element comprises an existing affiliate code, determining that the data element is not associated with a preferred affiliate code, removing the existing affiliate code associated with the data element, creating modified data at the intermediary computer by associating the preferred affiliate code with the data element, the modified data comprising at least one affiliate link associated with the affiliate-capable merchant, delivering the modified data to the first computer, and communicating the preferred affiliate code to the affiliate-capable merchant upon selection of the affiliate link.

2. The method as recited in claim 1 further comprising retrieving the preexisting data from a plurality of sources and delivering the modified data to a single user.

3. The method as recited in claim 1 further comprising retrieving the preexisting data from a single source and delivering the modified data to a plurality of users.

4. The method as recited in claim 1 further comprising retrieving the preexisting data from a plurality of sources and delivering the modified data to a plurality of users.

5. The method as recited in claim 1 further comprising retrieving the preexisting data from a single source and delivering the modified data to a single user.

6. The method as recited in claim 1 wherein the preexisting data is created immediately prior to the transmission thereof.

7. The method as recited in claim 1 further comprising defining the intermediary computer as a server.

8. A method for operating an automated affiliate manipulation system comprising:

identifying a request for preexisting data by a first computer over a communication network, analyzing the preexisting data at an intermediary computer to identify at least one data element corresponding to an affiliate-capable merchant, determining that the at least one data element comprises an existing affiliate code, determining that the data element does not comprise an affiliate code associated with a preferred commercial agent, removing the existing affiliate code associated with the data element, creating modified data at the intermediary computer by associating an affiliate code for the preferred commercial agent with the data element, the modified data comprising at least one affiliate link associated with the preferred commercial agent, and serving the modified data from the intermediary computer to the first computer.

* * * * *